April 8, 1930. H. J. SPALDING 1,753,305
TIRE FLAP HOLE MEASURING AND CUTTING PUNCH
Filed March 8, 1928
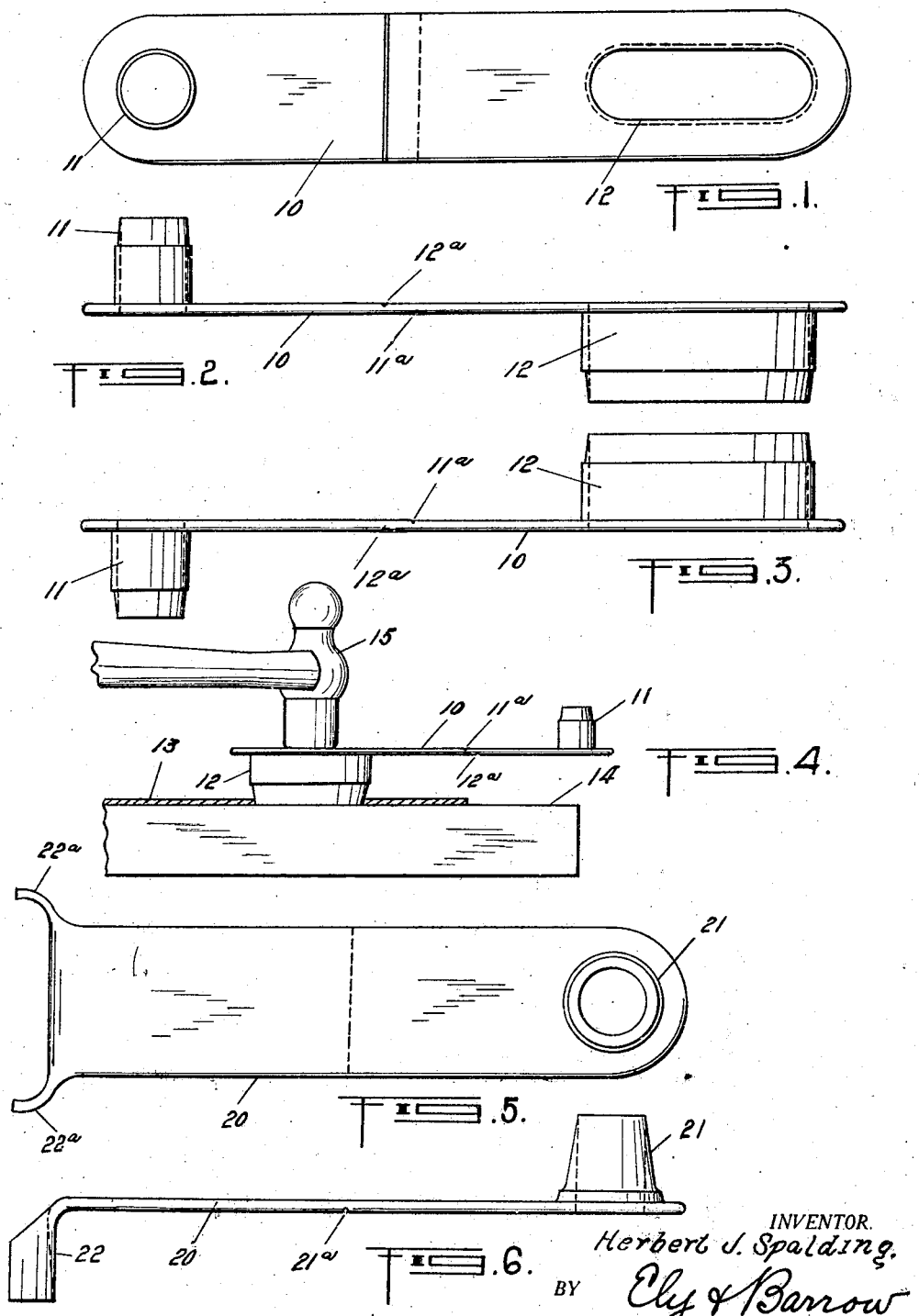

Patented Apr. 8, 1930

1,753,305

UNITED STATES PATENT OFFICE

HERBERT J. SPALDING, OF AKRON, OHIO

TIRE-FLAP HOLE MEASURING AND CUTTING PUNCH

Application filed March 8, 1928. Serial No. 260,109.

This invention relates to devices for use in measuring the location of tire flap valve holes and cutting said holes in a flap to fit it to tires and rims of different sizes.

It has been customary in the pneumatic tire art to employ strips of fabric or of rubber, or of both materials, to fit about the tire rims between the beads of the tires to prevent pinching of the inner tubes between the beads and the rims.

These flaps have been made up at the factories in various sizes, but more recently it has been found advisable, because of the large number of tire and rim sizes employed by different manufacturers, to provide the flap in lengths such that they can be cut and punched to proper dimensions.

Heretofore it has been the practice to measure and mark the location of the holes, and then cut the holes with shears or the like. This requires considerable time and the edges of the holes are rough and uneven and are thus subject to rapid wear.

The present invention has for its object the provision of a punching tool of simple construction capable of quickly locating and punching valve holes in tire flaps.

More particularly, the invention has for its object the provision of a tool including a preferably flat shank having one or more valve hole punches located thereon and having means for positioning the punch a predetermined distance from the end of the flap, whereby by the blow of a hammer applied to the shank when the punch is so positioned, a hole can be punched in the flap at the desired location.

The foregoing and other objects of the invention are obtained by the devices shown in the accompanying drawings and described below. It is to be understood that the invention is not limited to the specific forms thereof shown and described.

Of the accompanying drawings,

Figure 1 is a plan view of one face of a hole locating and punching device embodying the invention;

Figure 2 is a side elevation thereof in one operative position;

Figure 3 is a side elevation thereof in the other operative position;

Figure 4 is an elevation illustrating the device in use for locating and punching a valve hole in a flap;

Figure 5 is a plan of a modified form of tool embodying the invention; and

Figure 6 is a side elevation thereof.

Referring to Figures 1 to 4 of the drawings, the numeral 10 designates the shank of the tool, preferably a flat strip of metal having punches 11 and 12 respectively secured in apertures in the opposite ends thereof and respectively projecting in opposite directions from said strip 10. Punch 11 is usually round, but punch 12 is elongated to form an elongated hole to receive the valve stem whereby the flap, indicated at 13, may be self adjusting on a rim within the limits defined by the length of the aperture cut by punch 12.

On the face of the shank 10 opposite to that from which punch 11 projects, there is provided a scoring or other suitable hole locating means 11$^a$, the distance of which from punch 11 is predetermined to properly locate the round hole in flap 13 with respect to one end thereof.

Similarly on the other face of shank 10, there is provided a scoring or other suitable indicating means at 12$^a$.

In the use of the punch as described above, the flap, cut to length ready to be punched, is laid upon a surface as indicated at 14 and the punch is held over the end of the flap with the scoring on the upper surface of the shank 10 in alignment with the end of the flap and the punch corresponding to the hole to be punched centered with respect to the width thereof (see Figure 4 showing punch 12 so positioned). A hammer 15 is then used to apply a blow to the upper surface of the tool with sufficient force to punch out the material to form the desired aperture.

In Figures 5 and 6, a similar tool is shown, including shank 20 and round hole punch 21 and scoring 21$^a$, the difference in construction being that to form the elongated hole, the shank 10 is formed at the end opposite from punch 21 with a downwardly turned portion 22 having bent side flanges 22$^a$, 22$^a$ so shaped as to adapt the punch 22 to punch one side of an elongated valve hole.

This tool is used in a manner similar to the first described tool with the exception that the elongated hole is located by positioning one flange 22ª at the end of the flap and preferably scoring the flap slightly with the other flange 22ª and then holding the tool over the flap, first from one side and then the other with the punch 22 properly positioned by the scoring and in each position of the punch applying a blow of a hammer to shank 20.

It is to be observed that by having the punches project from opposite sides of the shank, as shown, there is no danger of an operative injuring his hands with one punch when applying the blow of the hammer to the other punch.

It will appear from the foregoing that a simple, but effective tool has been provided for the purpose described. It will also be apparent that modifications of this invention may be resorted to without departing from the spirit thereof or the scope of the appended claim.

What is claimed is:—

A device for locating and punching a valve hole in a strip of material to form a tire flap, comprising a flat shank, and a punch mounted on the shank adjacent one end thereof, said punch projecting from one face of the shank, said shank being provided with a marking on the other face thereof for locating the punch with respect to the end of the strip.

HERBERT J. SPALDING.